United States Patent
Marvin

(10) Patent No.: US 7,525,211 B2
(45) Date of Patent: Apr. 28, 2009

(54) CONTROL SYSTEM FOR TWIN TURBINE WIND POWER GENERATING SYSTEM

(76) Inventor: Russell H. Marvin, 88 E. Hyerdale Rd., Goshen, CT (US) 06756

( * ) Notice: Subject to any disclaimer, the term of this patent is extended or adjusted under 35 U.S.C. 154(b) by 0 days.

(21) Appl. No.: 11/820,741

(22) Filed: Jun. 19, 2007

(65) Prior Publication Data

US 2008/0315585 A1 Dec. 25, 2008

(51) Int. Cl.
F03D 9/00 (2006.01)
H02P 9/04 (2006.01)

(52) U.S. Cl. .......................... 290/44; 290/55

(58) Field of Classification Search .......... 290/44, 290/55

See application file for complete search history.

(56) References Cited

U.S. PATENT DOCUMENTS

| | | | | |
|---|---|---|---|---|
| 4,021,140 A | * | 5/1977 | Weisbrich | 416/117 |
| 4,110,631 A | * | 8/1978 | Salter | 290/55 |
| 4,156,579 A | * | 5/1979 | Weisbrich | 415/2.1 |
| 4,159,427 A | * | 6/1979 | Wiedemann | 290/55 |
| 4,174,923 A | * | 11/1979 | Williamson | 415/211.1 |
| 4,288,199 A | * | 9/1981 | Weisbrich | 415/232 |
| 4,320,304 A | * | 3/1982 | Karlsson et al. | 290/55 |
| 4,332,518 A | * | 6/1982 | Weisbrich | 415/232 |
| 4,340,822 A | * | 7/1982 | Gregg | 290/55 |
| 4,540,333 A | * | 9/1985 | Weisbrich | 415/4.3 |
| 5,083,039 A | * | 1/1992 | Richardson et al. | 290/44 |
| 5,146,096 A | * | 9/1992 | McConachy | 290/44 |
| 5,225,712 A | * | 7/1993 | Erdman | 290/44 |
| 5,289,041 A | * | 2/1994 | Holley | 290/44 |
| 5,526,252 A | * | 6/1996 | Erdman | 363/41 |
| 5,876,181 A | * | 3/1999 | Shin | 415/2.1 |
| 6,100,600 A | * | 8/2000 | Pflanz | 290/54 |
| 6,294,844 B1 | * | 9/2001 | Lagerwey | 290/55 |
| 6,850,426 B2 | * | 2/2005 | Kojori et al. | 363/123 |
| 7,042,110 B2 | * | 5/2006 | Mikhail et al. | 290/44 |
| 7,075,189 B2 | * | 7/2006 | Heronemus et al. | 290/44 |
| 7,086,835 B2 | * | 8/2006 | Yoshida | 416/9 |
| 7,244,100 B2 | * | 7/2007 | Yoshida | 416/9 |
| 2002/0198648 A1 | * | 12/2002 | Gilbreth et al. | 701/100 |
| 2003/0168864 A1 | * | 9/2003 | Heronemus et al. | 290/55 |
| 2004/0245783 A1 | * | 12/2004 | Gilbreth et al. | 290/52 |
| 2005/0012339 A1 | * | 1/2005 | Mikhail et al. | 290/44 |
| 2005/0017514 A1 | * | 1/2005 | Tocher | 290/55 |
| 2005/0042093 A1 | * | 2/2005 | Yoshida | 416/41 |
| 2005/0093373 A1 | * | 5/2005 | Chapman et al. | 307/80 |
| 2005/0162018 A1 | * | 7/2005 | Realmuto et al. | 307/44 |
| 2005/0169755 A1 | * | 8/2005 | Yoshida | 416/132 B |
| 2006/0067825 A1 | * | 3/2006 | Kilaras | 416/179 |
| 2006/0092588 A1 | * | 5/2006 | Realmuto et al. | 361/62 |
| 2006/0138782 A1 | * | 6/2006 | Friesth | 290/55 |
| 2007/0024247 A1 | * | 2/2007 | Ichinose et al. | 322/24 |

(Continued)

*Primary Examiner*—Julio C Gonzalez
*Assistant Examiner*—Pedro J Cuevas
(74) *Attorney, Agent, or Firm*—Theodore R. Paulding

(57) ABSTRACT

A wind turbine control system for twin turbines mounted in common on an accelerator comprising a DC boost converter having pulse width capability, power, speed, current and voltage sensors responsive to an generator driven by one turbine, and a controller. The controller adjusts the PWM duty cycle to adjust generator output whereby to control turbine thrust and thereby adhere to a desired performance curve, and also changes thrust to adjust angular position of the accelerator and thus maintain optimum angle of attack of the wind on turbine blades.

14 Claims, 5 Drawing Sheets

U.S. PATENT DOCUMENTS

| | | | |
|---|---|---|---|
| 2007/0138021 A1* | 6/2007 | Nicholson | 205/628 |
| 2007/0246943 A1* | 10/2007 | Chang et al. | 290/44 |
| 2008/0023964 A1* | 1/2008 | Sureshan | 290/55 |
| 2008/0061559 A1* | 3/2008 | Hirshberg | 290/55 |
| 2008/0093861 A1* | 4/2008 | Friesth et al. | 290/55 |
| 2008/0124217 A1* | 5/2008 | Friesth | 416/132 B |

* cited by examiner

CONTROL SYSTEM FOR TWIN TURBINE WIND POWER GENERATING SYSTEM

BACKGROUND OF THE INVENTION

Twin wind turbines mounted on a common rotatable support for rotation about horizontal axes are shown in the following U.S. patents, disclosures incorporated herein by reference;

U.S. Pat. Nos. 4,021,140
  4,156,579
  4,288,199
  4,332,518
  4,540,333

Control systems for operating the turbines are not disclosed in the foregoing patents, however, nor have suitable control systems been found anywhere in the prior art.

Accordingly, it is the general object of the present invention to provide a control system for operating twin wind turbines of the type mentioned which is simple in design, which may be constructed at economic advantage, and which is yet highly efficient and durable in operation.

SUMMARY OF THE INVENTION

In fulfillment of the foregoing object and in accordance with the present invention a DC boost converter with variable pulse width capability is provided and receives the output of at least one of the electrical generators conventionally associated with wind driven turbines employed to generate electricity. Sensing means monitors at least one of the power, speed, voltage or current outputs of the one generator and a controller is provided and receives signals from the sensing means. The controller includes a reference in the form of a predetermined desired performance curve for the generator and is connected with the boost converter and operates to adjust the generator output in accordance with the desired performance curve. Further, the controller operates to adjust generator output to adjust the thrust of the turbine associated therewith and thus adjusts the angular position of the support associated with the turbines.

More particularly, the adjustment of the output of the said one generator is accomplished by adjusting the PWM duty cycle of the boost converter associated with the said one turbine.

Preferably, the controller employs current and voltage or speed signals from the sensing means to calculate actual power and compare the same with the predetermined performance curve. When an AC generator is employed frequency may of course be sensed as the speed signal. Upper and lower power limits may also be established.

Further, the generator is preferably of the permanent magnet three phase type with at least one phase sensed.

In addition to the foregoing control parameters, it is advantageous to have a position sensor for the turbine support which advises the controller of the instantaneous angular position of the support. Meteorological data including wind speed and direction is also desirable and is supplied to the computer from appropriate instrumentation on a stationary portion of a tower which carries the supports for the wind turbines.

Finally, it should be noted that the supports for the turbines are configured to split and accelerate a stream of wind as it approaches the turbines and may therefore be appropriately referred to as accelerators as well as supports.

In its simplest form expressed as an algorithm, the present system controls a variable speed fixed pitch wind turbine by adjusting at least two of sensed generator speed, current, voltage and power outputs to adhere to a predetermined relationship whereby the operation of the turbine affects the operation of its twin turbine mounted on a common support.

DESCRIPTION OF PREFERRED EMBODIMENT

Figure 1:
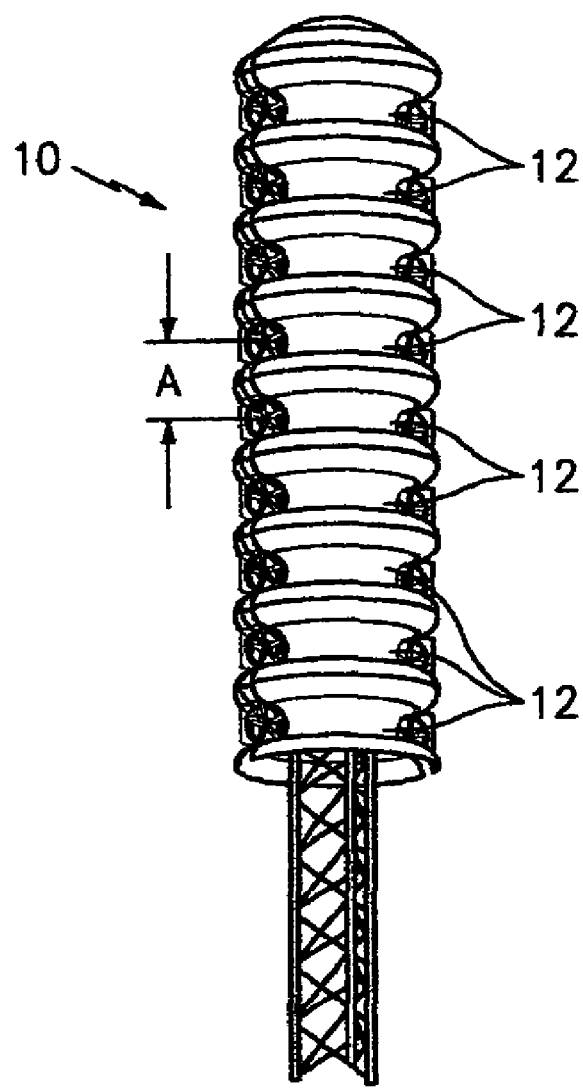
FIG. 1 is a schematic view of a tower carrying a vertical series of supports or accelerators each in turn carrying a pair of wind turbines spaced apart horizontally and each rotatable about a horizontal axis, the axes being in parallel relationship.

Referring particularly to FIG. 1, a tower indicated generally at 10 carries ten (10) horizontally rotatable accelerators 12,12 with stationary spacer members 14,14 therebetween.

Figure 2:
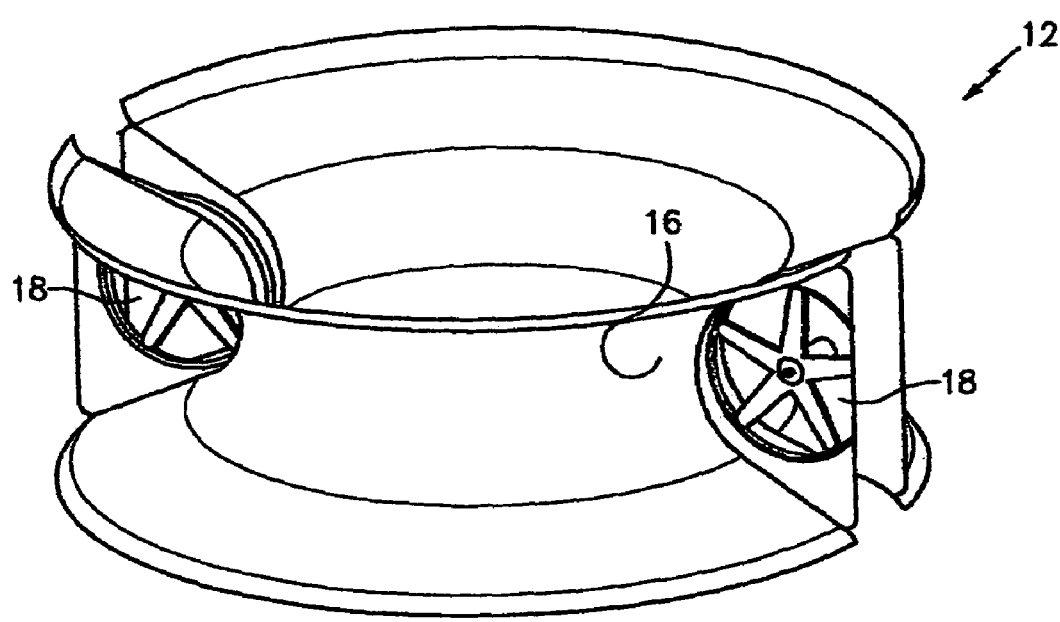
FIG. 2 is an enlarged view of a single support or accelerator and a pair of wind turbines mounted thereon.
Figure 3:
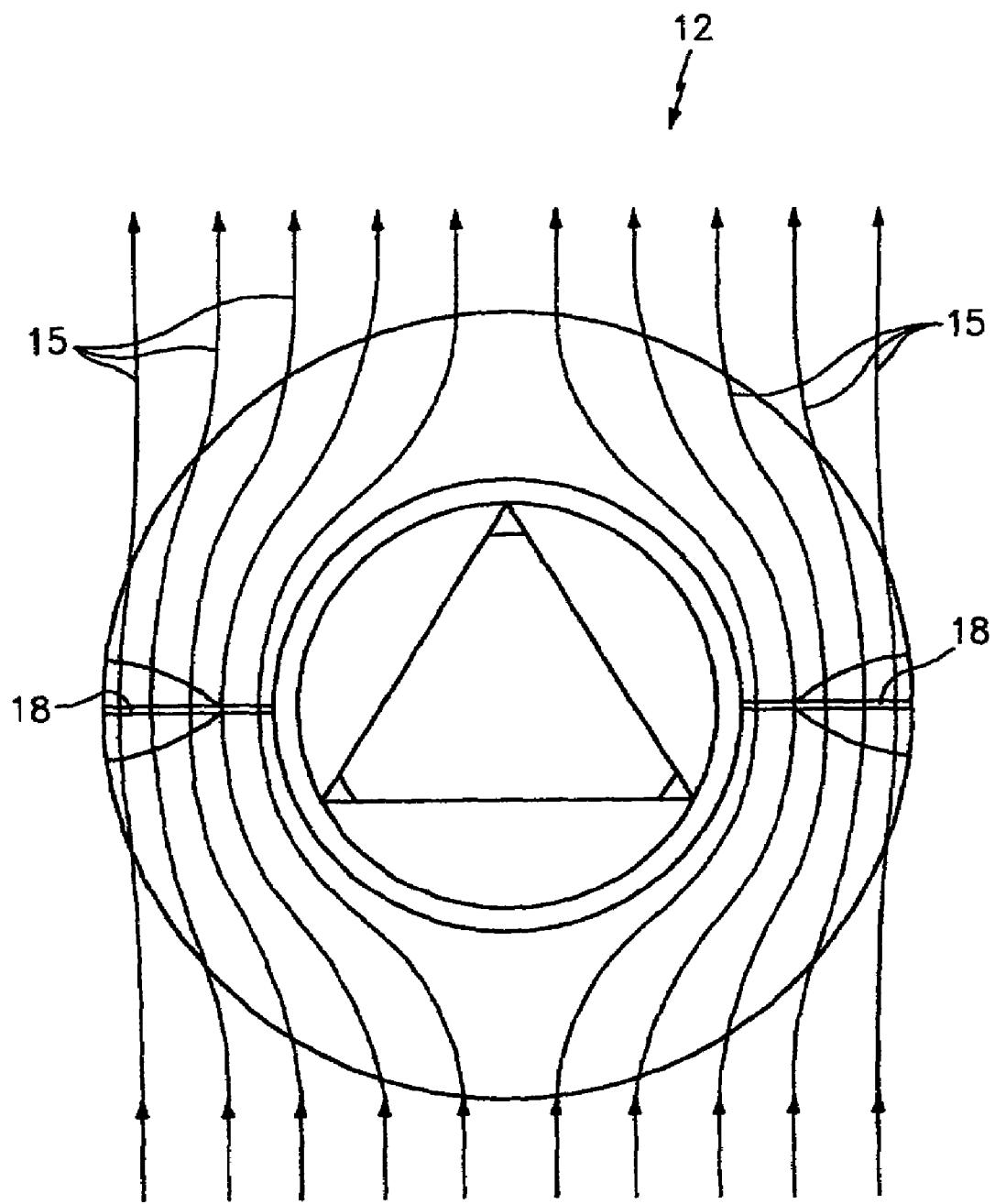
FIG. 3 is an enlarged horizontal cross sectional view through a support or accelerator showing wind flow therethrough.

As best illustrated in FIG. 2, each accelerator 12 takes a generally circular configuration with an annular recess 16, approximately semi-circular in cross section, opening radially outwardly and extending throughout its circumference. Twin turbines 18,18 are mounted on horizontal shafts and spaced apart one-hundred and eighty degrees to receive bifurcated wind generated air streams as best illustrated in FIG. 3. As will be apparent, each stream of air is accelerated as it proceeds from the front of the accelerator rearwardly and outwardly about the arcuate surface of the recess 16.

Figure 4A:
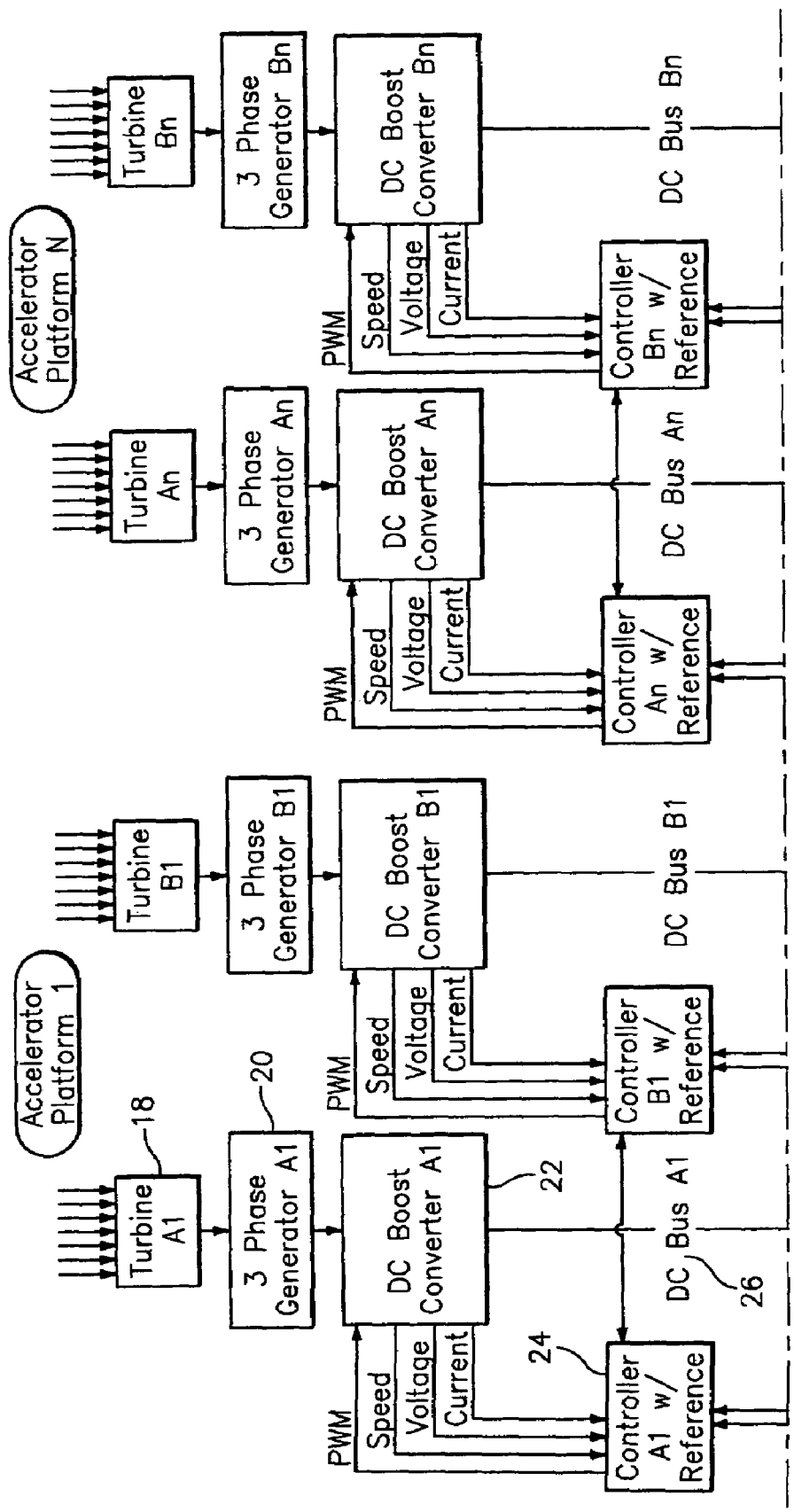
FIG. 4 is a block diagram illustrating twin turbines and their associated generators and control system.
Figure 4B:
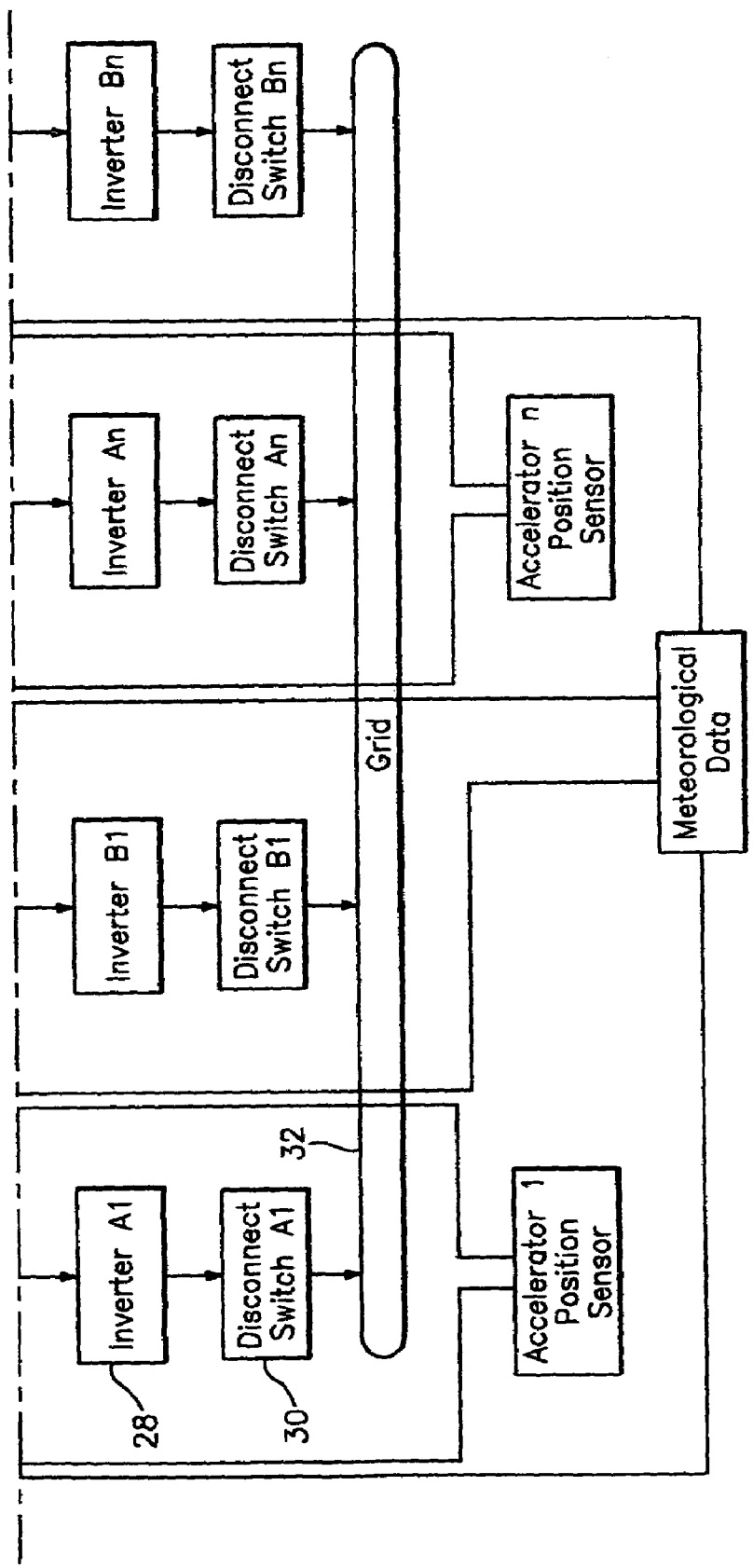

Referring now to FIG. 4, it will be obvious that all four turbine generator control systems are identical with A1 and B1 representing turbines in common on a first accelerator and An and Bn representing turbines mounted in common on other accelerators. The A1 system will be described as representative.

Turbine 18 drives generator 20 which may be conventional and of a variety of different constructions but which is preferably of the three phase permanent magnet AC type.

DC boost converter 22 may be conventional with variable pulse width capability and has conventional speed, voltage and current sensing means associated therewith and connected with the controller 24. Controller 24, preferably a conventional micro processor type, receives signals from the sensing means, calculates power therefrom, and compares with a reference in the form of a desired performance curve. The computer 24 then adjusts the PWM duty cycle to adjust generator output as required to bring the output into compliance with the desired curve. Further, the computer serves to adjust the generator output to adjust the thrust of its associated turbine and thereby adjust the angular position of the accelerator to maintain an optimum angle of attack for the wind relative to the turbine blades. This is accomplished by adjusting the relative thrust until the accelerator stops rotating.

From the boost converter 22 generator output proceeds conventionally through DC bus 26, inverter 28, and disconnect switch 30 to grid 32.

From the foregoing it will be apparent that a desireably simple control design has been provided for ease and convenience in manufacture and for efficient operation over a long service life.

The invention claimed is:

1. In a wind power generating system comprising at least two wind turbines mounted in common on a horizontally rotatable support in spaced relationship with each other on opposite sides of the axis of the support for rotation about horizontal axes, each turbine being connected in driving relationship with an electrical generator in turn connected with an external load; an improved control system comprising a DC boost converter with variable pulse width capability receiving the output of at least one generator, sensing means monitoring at least one of the power, speed, voltage, and current outputs of said one generator, a controller connected with and receiving signals from said sensing means and including a reference in the form of a desired performance curve for said generator, the controller also being connected in controlling relationship with said generator through said boost converter and operating to adjust the generator output, whereby said at least one generator is operated by said controller to adjust generator output and thereby adjust thrust of the turbine associated therewith and the angular position of the accelerator.

2. A wind powered generating system as set forth In claim 1 wherein said adjustment of generator output is made by adjusting the PWM duty cycle.

3. A wind powered generating system as set forth in claim 1 wherein the controller employs current and voltage signals from the sensing means to calculate actual power and compare the same with desired power as indicated by said performance curve.

4. A wind powered generating system as set forth in claim 1 wherein the generator is of the three phase type, and wherein the current and voltage of at least one phase are sensed.

5. A wind powered generating system as set forth in claim 1 wherein the generator is of the permanent magnet type.

6. A wind turbine generating system as set forth in claim 1 wherein the controller calculates the power output from the speed and current outputs of the generator.

7. A wind turbine generating system as set forth in claim 1 wherein a support position sensor is included and advises the controller of the angular position of the support.

8. A wind turbine generating system as set forth in claim 1 wherein an upper power limit is established by the controller, the latter serving to adjust the angular position of the support as required to reduce power when said limit is exceeded.

9. A wind turbine generating system as set forth in claim 1 wherein a lower power limit is established by the controller, the latter serving to adjust the angular position of the support as required to increase power when said limit is exceeded.

10. A wind turbine generating system as set forth in claim 1 wherein the generator is of the AC type, and wherein speed is measured by the controller by sensing the frequency of the AC signal from the generator.

11. A wind turbine generator as set forth in claim 1 wherein a vertical series of supports each carrying a pair of wind turbines are mounted on a vertical tower having stationary sections, and wherein meteorological data gathering devices are mounted on a stationary section and connected with said controller.

12. A wind turbine generating system as set forth in claim 11 wherein the data includes wind speed.

13. A wind turbine generating system as set forth in claim 11 wherein the data includes wind direction.

14. A wind turbine generating system as set forth in claim 1 wherein each support takes the form of an accelerator, and wherein each accelerator is configured to separate the air into two distinct air streams and accelerate each air stream before it enters its respective turbine.

* * * * *